(12) United States Patent
Peters

(10) Patent No.: US 10,888,079 B2
(45) Date of Patent: Jan. 12, 2021

(54) LURE RETRIEVAL APPARATUS HAVING TIP PIECE WITH RESILIENT APPENDAGE

(71) Applicant: Side Kick Lure Retriever LLC, Bedford, IN (US)

(72) Inventor: Tony Lee Peters, Bedford, IN (US)

(73) Assignee: Side Kick Lure Retriever LLC, Bedford, IN (US)

( * ) Notice: Subject to any disclaimer, the term of this patent is extended or adjusted under 35 U.S.C. 154(b) by 174 days.

(21) Appl. No.: 15/881,745

(22) Filed: Jan. 27, 2018

(65) Prior Publication Data

US 2018/0213762 A1 Aug. 2, 2018

Related U.S. Application Data

(60) Provisional application No. 62/451,143, filed on Jan. 27, 2017.

(51) Int. Cl.
*A01K 97/24* (2006.01)

(52) U.S. Cl.
CPC .................... *A01K 97/24* (2013.01)

(58) Field of Classification Search
CPC .. A01K 97/24; A63B 29/02; B25J 1/04; B25J 1/02; B63B 21/54; A47F 13/06; A43B 5/0425; A45F 5/10; A63C 11/023; A47G 2001/0688; H01K 3/32; H01J 9/003; H01J 9/006; G09F 7/18; G09F 2007/186
USPC ............... 43/17.2, 17, 4, 5, 6.5, 8, 24, 25; 294/66.1, 66.2, 191, 99.1, 209, 148, 19.2, 294/23, 24, 210; 226/196; 242/241, 273, 242/389
See application file for complete search history.

(56) References Cited

U.S. PATENT DOCUMENTS

| | | | |
|---|---|---|---|
| 1,948,077 A | | 2/1934 | Prescott et al. |
| 2,083,814 A | | 6/1937 | Bence |
| 2,344,838 A | | 3/1944 | Van Sickle |
| 2,553,173 A | * | 5/1951 | Consolo ................. A01K 97/24 43/17.2 |
| 2,718,084 A | | 9/1955 | Gustafson |
| 2,770,062 A | * | 11/1956 | Russell ................... A01K 97/24 43/17.2 |
| 2,940,203 A | | 6/1960 | Carter |
| 2,979,847 A | * | 4/1961 | McKinney ............. A01K 97/24 43/17.2 |

(Continued)

OTHER PUBLICATIONS

Century Springs Corp., Catalog Web, 2015, MW Industries Inc., p. 149 and 155 (Year: 2015).*

*Primary Examiner* — Darren W Ark
*Assistant Examiner* — Katelyn T Truong
(74) *Attorney, Agent, or Firm* — Brannon Sowers & Cracraft PC

(57) ABSTRACT

A tip for a fishing lure retrieval apparatus includes a tip body having an outer peripheral surface extending longitudinally between first and second tip body ends. The tip body is structured for threaded engagement with an extension handle, and includes a resilient appendage attached to the tip body at a location that is axially between the first tip body end which attaches to the handle, and the second tip body end. The resilient appendage may include a coil spring that projects from the outer peripheral surface and has formed therein slots distributed successively along the resilient appendage to receive a fishing line at a range of locations relative to the tip body.

17 Claims, 5 Drawing Sheets

(56) References Cited

U.S. PATENT DOCUMENTS

| | | | | |
|---|---|---|---|---|
| 3,010,241 A | * | 11/1961 | Terry | A01K 97/24 43/17.2 |
| 3,382,599 A | | 5/1968 | Beverly | |
| 3,520,569 A | * | 7/1970 | Anderson | A63B 47/02 294/19.2 |
| 3,693,280 A | | 9/1972 | Calhoun | |
| 3,743,338 A | * | 7/1973 | Seeger | A63B 47/02 294/19.2 |
| 3,805,435 A | | 4/1974 | Serrill | |
| 3,810,669 A | * | 5/1974 | Reid | A63B 47/02 294/19.2 |
| D247,301 S | * | 2/1978 | Ostoski | D22/149 |
| 4,086,718 A | * | 5/1978 | Swanson | A01K 97/24 43/17.2 |
| 4,433,501 A | | 2/1984 | Maxwell | |
| D274,547 S | * | 7/1984 | Godlewski | D22/134 |
| 4,508,467 A | | 4/1985 | Choffin | |
| 4,598,493 A | | 7/1986 | O'Brien et al. | |
| 4,622,772 A | * | 11/1986 | Cawley | A01K 97/24 43/17.2 |
| 4,687,204 A | * | 8/1987 | Lempio | A63B 47/02 294/19.2 |
| 4,712,324 A | | 12/1987 | Padgett | |
| 4,885,863 A | | 12/1989 | Sprague | |
| 5,112,093 A | * | 5/1992 | Kindling | A63B 47/02 294/19.2 |
| 5,187,878 A | * | 2/1993 | Kuttner | A01K 91/20 33/719 |
| 5,452,537 A | * | 9/1995 | Ellison, Jr. | A01K 97/24 43/17.2 |
| 6,305,119 B1 | | 10/2001 | Kacak | |
| 6,422,622 B1 | * | 7/2002 | Bernard | G09F 7/18 294/209 |
| 6,442,886 B1 | | 9/2002 | McAfee et al. | |
| D596,264 S | * | 7/2009 | Miller | D22/149 |
| 2006/0229145 A1 | * | 10/2006 | Dempsey | A63B 47/02 473/408 |
| 2011/0258902 A1 | * | 10/2011 | Cason | A01K 97/18 43/17.2 |

* cited by examiner

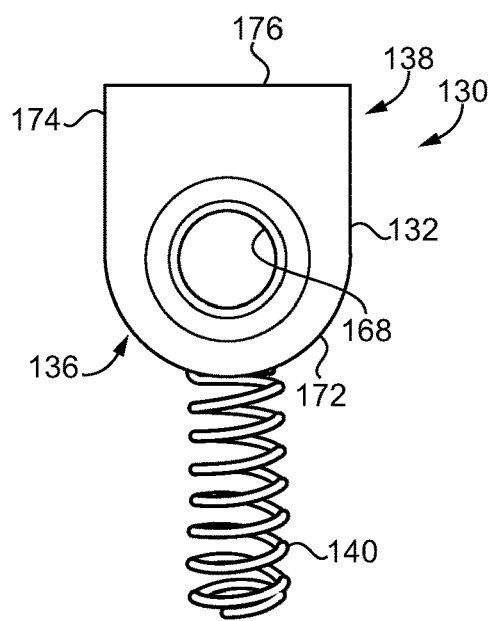 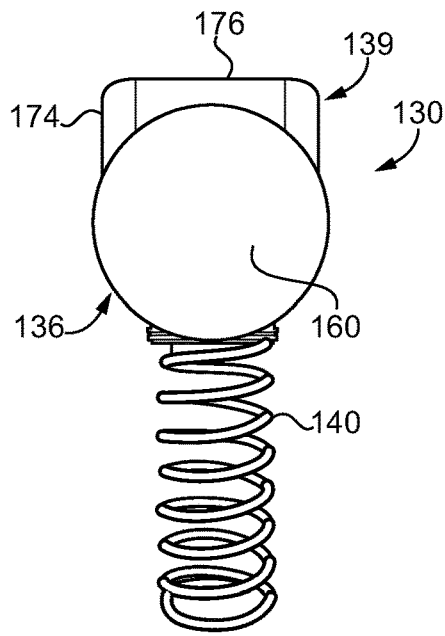
FIG. 7          FIG. 8
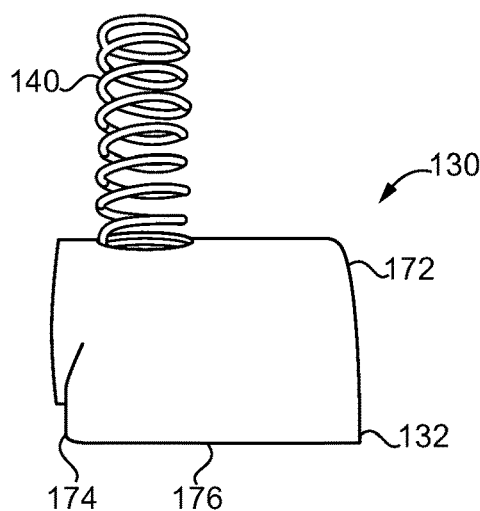 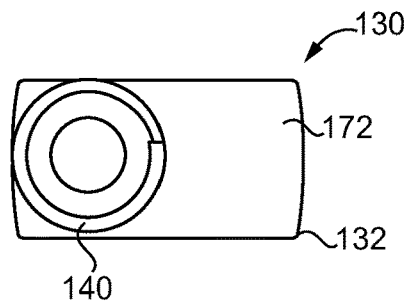
FIG. 9          FIG. 10

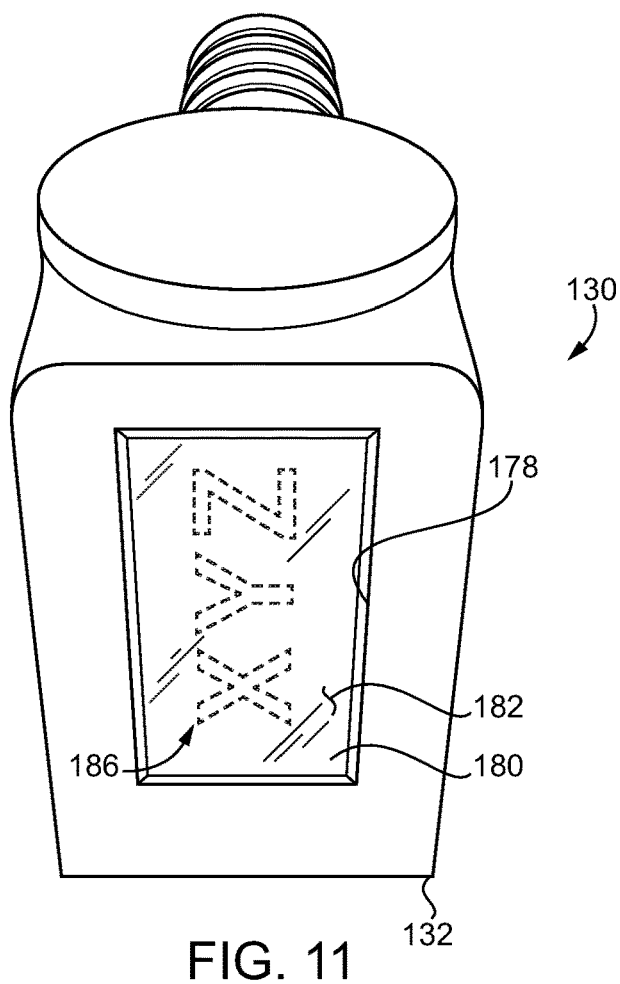
FIG. 11
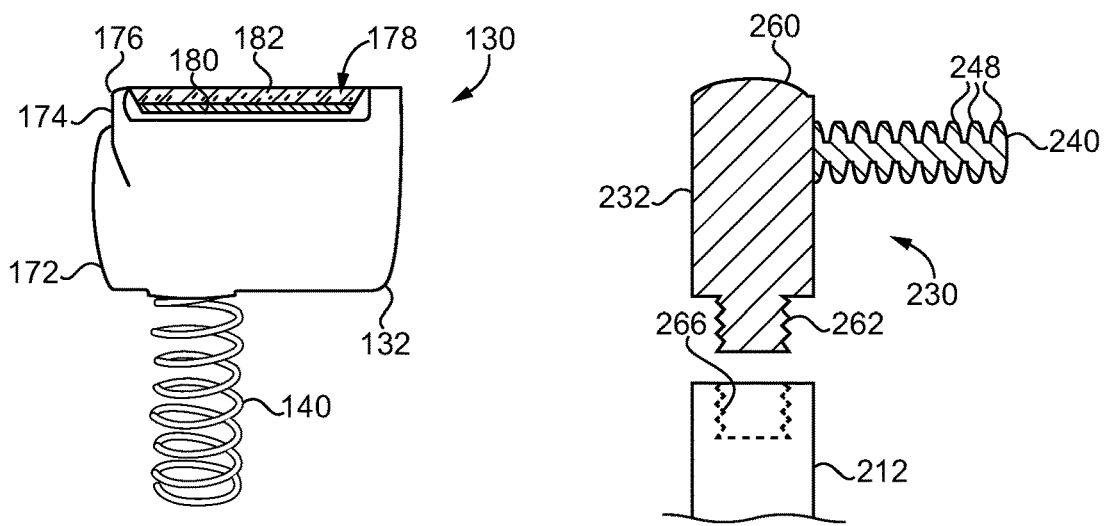
FIG. 12
FIG. 13

LURE RETRIEVAL APPARATUS HAVING TIP PIECE WITH RESILIENT APPENDAGE

TECHNICAL FIELD

The present disclosure relates generally to the field of sport fishing accessories, and more particularly to a uniquely structured fishing lure retrieval apparatus.

BACKGROUND

Fishermen tend to fish in areas that contain heavy cover such as underwater logs, tree branches, stumps, roots, et cetera, as well as structures such as rocks and ledges. Such locations are sought out because they typically contain higher concentrations of desirable game fish. When fishing such locations, fishing lures often become snagged on underwater objects, or trapped in rock crevices. Fishermen often also make casts that are high or long, resulting in lures becoming stuck in trees or upon lakeshore structures. Underwater snagging often leaves fishermen with no choice but to cut their line resulting in a loss of a relatively expensive lure. In the case of lures stuck in trees or the like, when too high to reach or stuck on shoreline rocks or bushes, a fisherman will often opt not to risk damaging or scratching expensive boat hulls and will cut their line, leaving the valuable lure behind.

Other shortcomings of modern sportfishing equipment and practices relate to difficulties in maneuvering boats against obstacles or near docks. Fishermen often use objects that are available in their boats such as fishing rods or fishing nets to push their boats into deeper water or away from obstructions. There are, moreover, certain instances where boats need to be maneuvered into relatively small recovery areas for retrieving items or articles lost overboard. In the case of a floating lifejacket or boat cushion, for instance, maneuvering a fishing boat to retrieve the item by hand can often be equated to hitting a circular bullseye six feet across on a dartboard the size of a lake. With adverse weather conditions several passes through a recovery area can be necessary to complete such a task.

Fishermen and fishing equipment suppliers have experimented with tools and techniques for retrieving equipment and addressing other sportfishing problems for many years. U.S. Pat. No. 2,083,814 to W. J. Bence is directed to a Fisherman's Bait-Placing and Line-Freeing Device. Bence proposed a device whereby the baited end of the fishing line could be pushed to a desired point and then released, apparently placing the bait where desired. Another function of the apparatus proposed by Bence was providing a device which can be used to free the line if caught on a submerged object. A crotched loop at the front end of a pole was used to dislodge the line and provided a mechanism for traveling the pole down the line to reach a hook. While Bence's tool may have certain applications, there is always room for further innovation and improvement in the art.

SUMMARY OF THE INVENTION

In one aspect, a tip for a fishing lure retrieval apparatus includes a tip body defining a longitudinal axis, and having an outer peripheral surface extending around the longitudinal axis, and longitudinally between a first tip body end and a second tip body end. The first tip body end includes an engagement element having an engagement surface structured to engage with a mating surface of a handle for the lure retrieval apparatus to couple the tip to the handle. The tip further includes a resilient appendage attached to the tip body at a location that is axially between the first tip body end and the second tip body end. The resilient appendage projects from the outer peripheral surface and has formed therein a plurality of slots distributed successively along the resilient appendage in a radially outward direction, for receiving a fishing line at a range of locations relative to the tip body.

In another aspect, an apparatus for retrieving snagged fishing lures includes a handle having an elongate shaft extending between a gripping end and a retrieval end, and a tip. The tip includes a tip body defining a longitudinal axis, and an outer peripheral surface extending between a first tip body end coupled to the retrieval end of the handle, and a second tip body end. The tip further includes a resilient appendage attached to the tip body at a location that is axially between the first tip body end and the second tip body end. The resilient appendage projects from the outer peripheral surface and has formed therein a plurality of slots distributed successively along the resilient appendage in a radially outward direction, for receiving a fishing line at a range of locations relative to the tip body.

BRIEF DESCRIPTION OF THE DRAWINGS

FIG. 7 is an end view of a tip for a fishing lure retrieval apparatus, according to another embodiment;

FIG. 8 is an opposite end view of the tip of FIG. 7;

FIG. 9 is a side view of the tip of FIG. 7;

FIG. 10 is another side view of the tip of FIG. 7;

FIG. 11 is a perspective view of the tip of FIG. 7;

FIG. 12 is a partially sectioned side view of the tip of FIG. 7; and

FIG. 13 is a diagrammatic view of a fishing lure retrieval apparatus, according to yet another embodiment.

DETAILED DESCRIPTION

Figure 1:
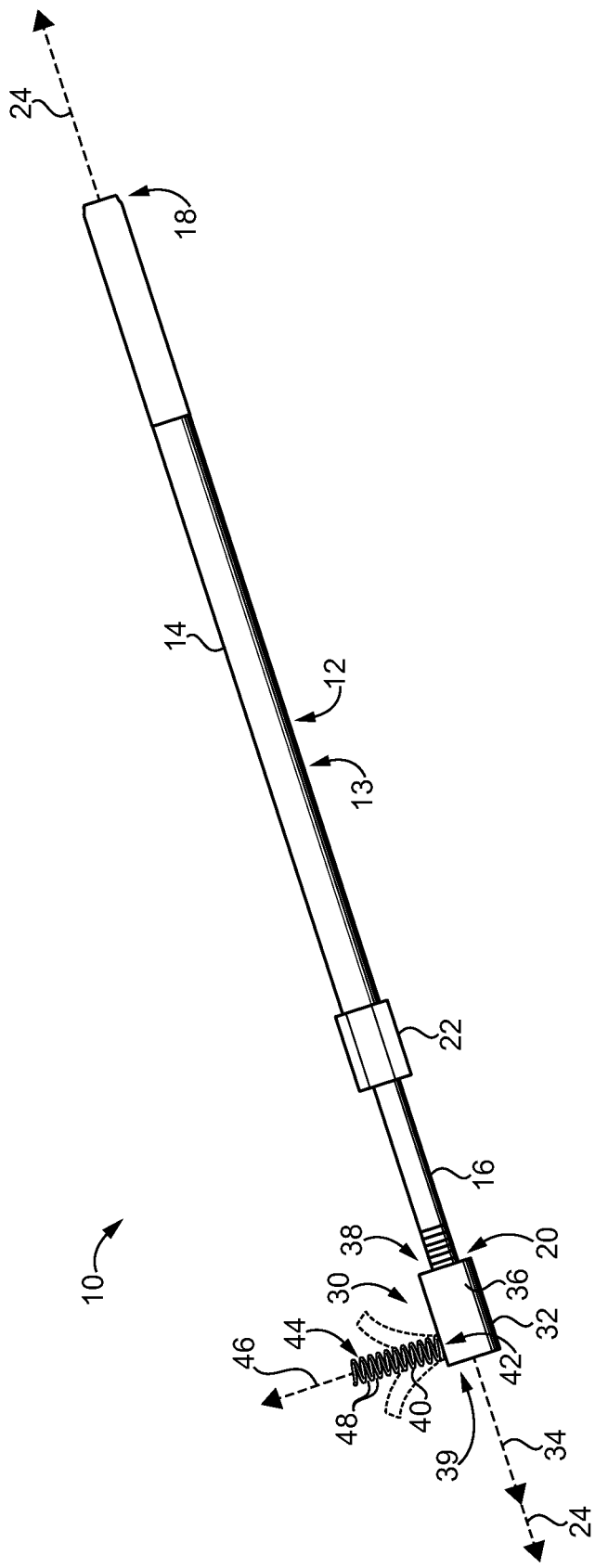
FIG. 1 is a diagrammatic view of a fishing lure retrieval apparatus, according to one embodiment.

Referring to FIG. 1, there is shown a fishing lure retrieval apparatus 10 according to one embodiment, and including a handle 12 having a shaft 13 formed by a first shaft component 14 that includes a gripping end 18, and a second shaft component 16 that includes a lure retrieval end 20. In the illustrated embodiment, shaft 13 includes a locking mechanism 22 coupled between first shaft component 14 and second shaft component 16. Each of first shaft component 14 and second shaft component 16 are elongate, and are coaxially 24 arranged, with second shaft component 16 slidable within first shaft component 14 to vary a length of the shaft 13. Locking mechanism 22 can be of known design and is adjustable between an unlocking state at which shaft components 14 and 16 are slidable relative to one another, and a locking state. A variety of suitable known mechanisms for releasably coupling together shaft components in a handle are commercially available. In other embodiments a compound adjustable shaft having a number of slidable and telescoping shaft components greater than two, such as four, might be used. It is anticipated that handle 12 can be adjustable between a retracted length of 4-6 feet, and a telescopically extended length of 8-12 feet, for example. In other instances, handle 12 might not be adjustable at all and could be formed by a single shaft. A tip 30 is coupled to handle 12 and provides a mechanism for guiding retrieval apparatus 10 to a snagged fishing lure in a manner further discussed herein, and assists a user in dislodging the snagged lure.

Tip 30 includes a tip body 32 defining a longitudinal axis 34, and has an outer peripheral surface 36 extending around longitudinal axis 34. Outer peripheral surface 36 further extends longitudinally between a first tip body end 38 and a second tip body end 39. Tip body 32 may be elongate, with outer peripheral surface 36 having a variety of different shapes as further discussed herein. A resilient appendage 40 is attached to tip body 32 at a location that is axially between first tip body end 38 and second tip body end 39. Resilient appendage 40 can include a proximal end 42 adjacent to and/or abutting tip body 32, and a distal, free end 44 that is located radially outward of tip body 32. Resilient appendage 40 is shown in solid lines as it might appear at rest, and in phantom lines as it might appear deformed outwardly or inwardly generally in the plane of the page in FIG. 1. It will be appreciated that resilient appendage 40 can be deformed by bending in any direction, and can further be deformed by extension or compression and/or by extension or compression simultaneously with bending, the significance of which will be further apparent from the following description. Resilient appendage 40 projects from outer peripheral surface 36 and has formed therein a plurality of slots 48. Slots 48 are distributed successively along resilient appendage 40 in a radially outward direction, and are structured for receiving a fishing line at a range of locations relative to tip body 32.

Figure 2:
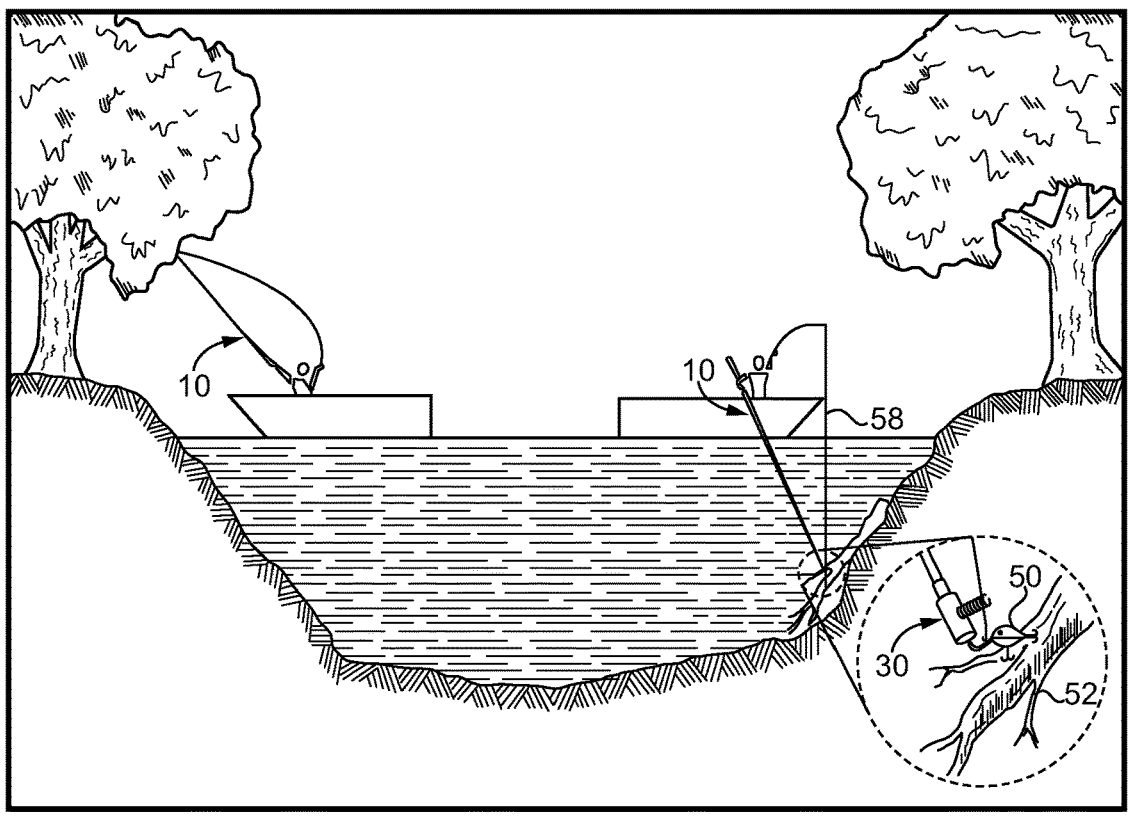
FIG. 2 is a concept illustration of fishing lure retrieval apparatuses in use, and including a detailed enlargement.

Referring also now to FIG. 2, there is shown a concept illustration of retrieval apparatus 10 as it might be used. At the left side of FIG. 2 there is shown a user with retrieval apparatus 10 being manipulated to retrieve a fishing lure snagged in an overhead tree. On the right side of FIG. 2 there is shown a user employing retrieval apparatus 10 to retrieve a snagged fishing lure 50, also depicted in a detailed enlargement, that is snagged on an underwater feature 52 such as a submerged tree branch or the like. A fishing line 58 is shown in the righthand illustration extending between the user and lure 50. It should be appreciated that "snagging" or "snagged" is used herein in an illustrative but not limiting sense. It will be understood that fishing lures can be caught in rock crevices, hooked into submerged tree branches, limbs, et cetera, or snagged in aquatic or terrestrial vegetation, overhead tree branches, bridges or other structures, or caught by a variety of other means. The present disclosure is contemplated to be applicable to retrieving fishing lures without limitation as to the manner in which the fishing lure is snagged.

Figure 3:
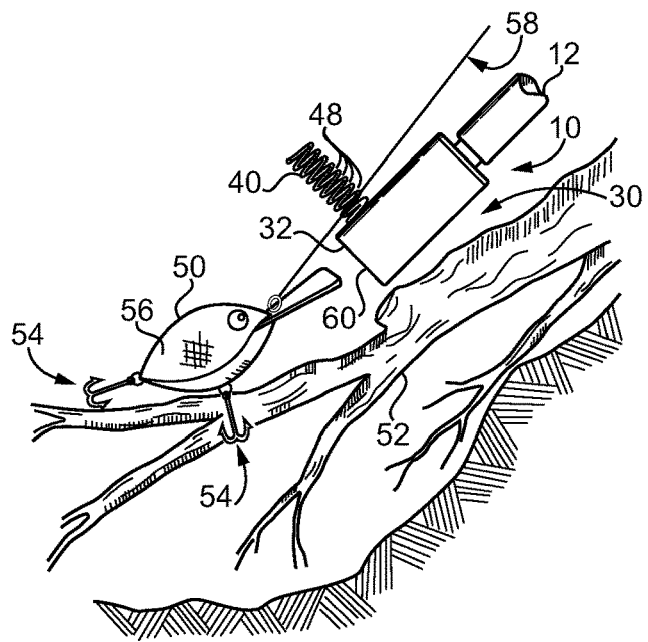
FIG. 3 is a closeup illustration of the apparatus of FIG. 1 as it might appear in use.

Referring also now to FIG. 3, there is shown retrieval apparatus 10 as it might appear with tip 30 positioned in proximity to lure 50. Lure 50 has a lure body 56, and hooks 54 hooked into/around underwater feature 52. Slots 48 are shown distributed within resilient appendage 40 as described, and retrieval apparatus 10 has been placed upon fishing line 58 and tracked and guided along fishing line 58 to a location of snagged lure 50 by way of receipt of fishing line 58 within one of slots 48. An end surface 60 of tip body 32 is shown positioned in proximity to lure body 56 and can be employed to push lure body 56 back away from underwater feature 52 to disengage hooks 54. It will be appreciated that retrieval apparatus 10 could be used to push a snagged lure away from or out of other underwater, or not underwater, features such as a rock crevice, manmade debris, or still other structures in a generally analogous manner. It will also be appreciated that once freed from snagging, a user can reel in lure 50 and complete retrieval of their now freed lure. Apparatus 10 can be lifted off of the fishing line.

Figure 4:
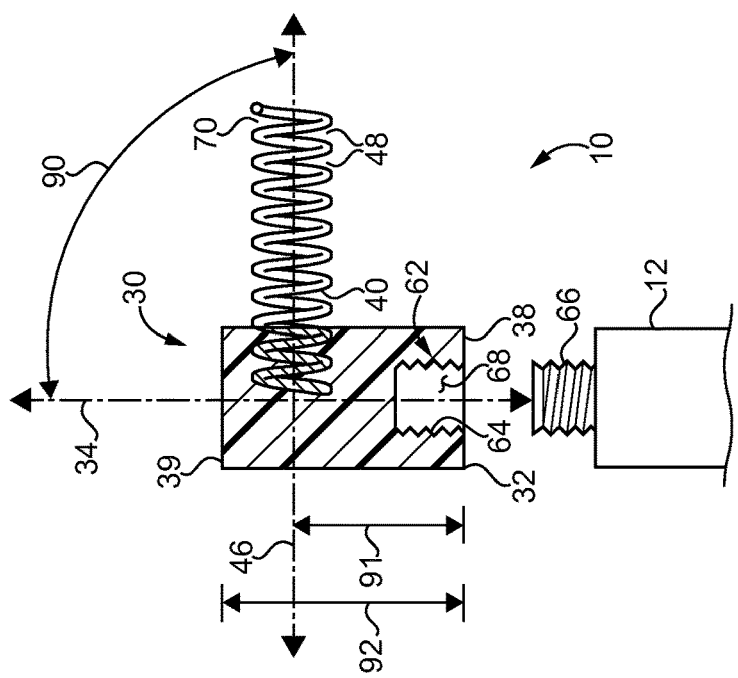
FIG. 4 is a partially sectioned side diagrammatic view of a portion of the apparatus of FIG. 1.

Turning now to FIG. 4, there are shown additional features of retrieval apparatus 10 in further detail. As shown in FIG. 4, tip 30 can be decoupled from handle 12. In a practical implementation strategy, tip 30 is structured such that tip body 32 can be releasably coupled with handle 12, which can be an off-the-shelf component. A variety of different strategies can be used for releasably attaching tip 30 to handle 12. To this end, first tip body end 38 can include an engagement element 62 having an engagement surface 64 structured to engage with a complementary or otherwise mating surface 66 of handle 12 to couple tip 30 to handle 12. In the illustrated embodiment, engagement element 62 includes a thread, such as an Acme thread, and engagement surface 64 includes a surface of the thread. Mating surface 66 of handle 12 can be an analogously and complementarily configured thread surface. Also in the illustrated embodiment, tip body 32 includes a bore 68 formed in first tip body end 38, and engagement elements/thread 62 includes an internal thread within bore 68. Thread(s) could be formed by casting or machining/milling in the present context, or a threaded insert could be installed in tip body 32, for instance. It should also be appreciated that use of the term "thread" herein in the singular is not intended to suggest that a single, continuous thread is the only anticipated implementation. For example, multiple threads might be formed within bore 68, and upon handle 12. Moreover, rather than a threaded engagement between tip 30 and handle 12, in other embodiments a slot-and-tab arrangement might be used, with a slot surface on tip body 32 and a tab surface on handle 12 engaged in contact with one another to couple tip 30 to handle 12, or vice versa with a slot surface on handle 12 and a tab surface on tip body 32. Still other coupling arrangements could include prongs on one or both of tip 30 and handle 12 that can be deformed into engagement with mating prong receptacles in the other of tip 30 or handle 12 as the case may be. Threaded screws, bolts or the like could be used to attach handle 12 to tip 30 in other embodiments. As also noted above, in still other instances handle 12 might be irreversibly attached to tip 30 such as by gluing, ultrasonic welding, or even formed integrally therewith.

Also shown in FIG. 4 is a transverse axis 46 defined by resilient appendage 40. In the illustrated embodiment, transverse axis 46 and longitudinal axis 34 intersect and define an angle 90. Transverse axis 46 may be oriented substantially normal to longitudinal axis 34, such that angle 90 is equal to about 90 degrees. It will also be recalled that resilient appendage 40 is attached to tip body 32 at a location axially between first tip body end 38 and second tip body end 39. The location of attachment may be relatively closer to second tip body end 39 than to first tip body end 38, with a distance 91 that extends between a terminal end (not numbered) of tip body end 38 and transverse axis 46 being less than a distance 92 corresponding to a full axial body length of tip body 32. In an implementation, distance 91 can be about 75 percent or greater of distance 92. A depth of bore 68 in an axial direction could be about 50 percent of distance 92, or less. It will also be recalled that slots 48 are distributed successively along resilient appendage 40 in a radially outward direction. In the illustrated embodiment, slots 48 are regularly distributed, and can be in communication with one another such slots 48 together form a helical void 70 extending circumferentially around transverse axis 46 a plurality of times. Resilient appendage 40 can include a coil spring in a practical implementation strategy, although the present disclosure is not thereby limited.

Figure 6:
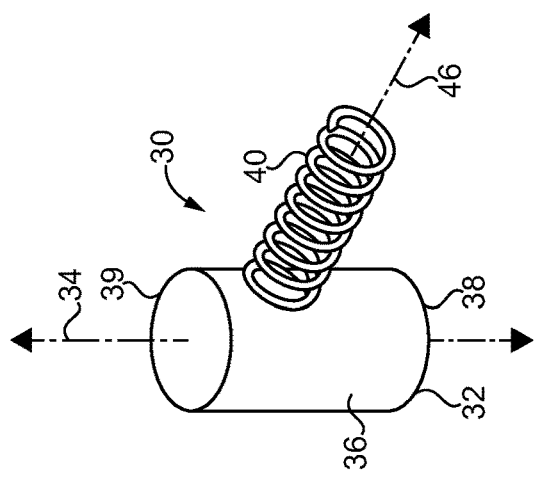
FIG. 6 is a diagrammatic view of the tip of FIG. 5.
Figure 5:
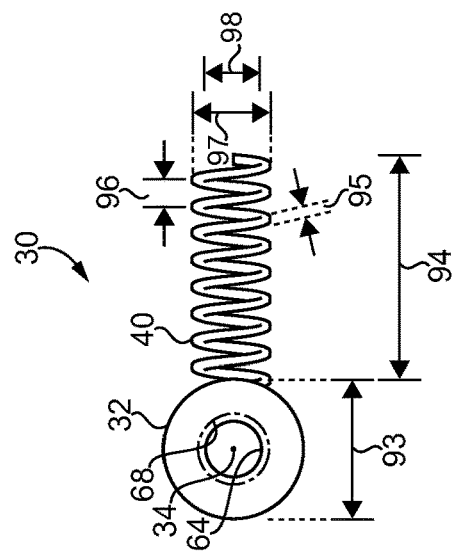
FIG. 5 is an end view of a tip of the apparatus of FIG. 1.

Referring also now to FIG. 5, there is shown an end view of tip 30 illustrating additional details including additional structural and proportional attributes. FIG. 5 can be understood to illustrate tip 30 as it might appear viewing down longitudinal axis 34 into bore 68. Tip body 32 can be seen to have a radial thickness or width 93, and resilient appendage 40 can be seen to have an axial length 94. Axial length 94 can be equal to about 3 inches in a practical implementation strategy. Also shown in FIG. 5 is a wire thickness or diameter 95, which might be equal to about 0.1 inches. A turn-to-turn distance 96, corresponding to a width of slots 48, may be from about 0.1 inches to about 0.3 inches, and more particularly may be from about 0.15 inches to about 0.20 inches. An outside diameter 97 of resilient appendage 40 may be about 1 inch or less, and an inside diameter 98 of resilient appendage 40 may be about 0.5 inches or greater. Distance/axial body length 92 may be about three times outside diameter 97 in one implementation. Resilient appendage 40 configured as a coil spring may have a spring rate of about 30 pounds per inch or greater, and more particularly a spring rate of about 38 pounds per inch. A number of slots 48 can be determined by a number of coils exposed externally of tip body 32, and in one implementation may be from about 5 to about 10. As used herein the term "about" can be understood in terms of conventional rounding to a consistent number of significant digits. Accordingly, "about 0.5" means from 0.45 to 0.54, "about 0.54" means from 0.535 to 0.544, and so on. The significance of the various features and characteristics of resilient appendage 40 in relation to its functioning in lure retrieval will be further apparent from the following description. In FIG. 6, there is shown a diagrammatic view, in perspective, of tip 30, illustrating a generally cylindrical shape to tip body 32.

Referring now to FIG. 7, there is shown a tip 130 according to another embodiment, and sharing features, function, and properties with previously described tip 30 except where otherwise indicated. For example, tip 30 can include a resilient appendage 140 structured identically to resilient appendage 40 discussed above. As shown in FIG. 7, tip 130 includes a tip body 132 having an outer peripheral surface 136. Outer peripheral surface 136 forms a shape that includes a rectangular portion or side 174, and a cylindrical portion or side 172. In the illustrated embodiment, the shape of tip body 132 can be such that cylindrical portion or side 172 is centered about a bore 168 configured analogously to bore 68 discussed above, and which will be understood to define a longitudinal axis (not shown) analogous to axis 34. Outer peripheral surface 136 also may include a substantially planar side 176. Planar side 176 can form one of the edges of rectangular portion or side 174. Planar side 176 may be at an angular location about bore 168, and by implication the longitudinal axis (not shown), that is opposite to an angular location about the axis of substantially cylindrical portion or side 172. Referring also to FIG. 8, there is shown tip 130 as it might appear flipped over to illustrate a tip body end 139 that is opposite to the tip body end 138 that faces upward in FIG. 7. In FIG. 9 there is shown a side view of tip 130, and FIG. 10 illustrates tip 130 as it might appear looking down a transverse axis (not shown) of resilient appendage 140. It will be noted resilient appendage 140 projects from cylindrical portion or side 172. It is contemplated that a substantially planar side such as side 176 can assist in limiting rolling of apparatus 10 when placed down on the deck of a boat or a dock, for example.

Referring now to FIGS. 10 and 11, there is shown a partially sectioned view and a perspective view, respectively, of tip 130. It can be seen from FIGS. 11 and 12 that a display receptacle 178 is formed in substantially planar side 176. An insert 180, such as a plastic or paper card or the like, with graphics 186 placed thereon, for example, can be placed within display receptacle 178, and retained by way of a transparent display cover 182 inset within display receptacle 178. Rather than a card or the like, graphics 186 could be formed by embossing, debossing, or ink, for example. Insert 180 could alternatively comprise solid letters, symbols, or a logo, for example. In an implementation, display cover 182 can include a clear resin poured into display receptacle 178 and allowed to cure therein, bonding with material of tip body 132. In other instances, a solid insert could be snapped into place with tip body 132 providing a bezel arrangement or the like, or secured by any other suitable means. It can be noted that display cover 182 can have a profile that is continuous with a side profile of tip body 132, protecting insert 180 and display cover 182 itself from being dislodged by scraping or collision with debris or the like during manipulating tip 130 to free a snagged lure or the like.

Referring now to FIG. 13, there is shown a tip 230 according to another embodiment and having certain similarities with the foregoing embodiments, but also certain differences. Tip 230 is shown with an engagement element 262 that protrudes outwardly from a tip body 232 such that it can be received within a bore in a handle 212. It can also be noted that an end surface 260 of tip body 232 has a domed shape rather than a planar shape as in other embodiments. A resilient appendage 240 is structured differently from a coil spring, yet has a plurality of slots 248 arranged generally analogously to that of the foregoing embodiments. Resilient appendage 40, 140, 240 (and any of the resilient appendages contemplated herein) could be machined from a piece of metal rod stock, formed from a polymer, or a polymer-coated coil spring, to name a few examples. In each of the embodiments of the present disclosure tip body 32, 132, 232 may be formed of a molded non-metallic material of uniform composition throughout. Suitable material is available, for example, under the trade name ProtoCast from Industrial Polymers Corporation of Dallas, Tex., although a wide variety of other elastomeric and other polymeric materials might be used. In an implementation, resilient appendage 40 is formed of a metallic material molded integrally with tip body 32, 132, 232. It should nevertheless be appreciated that a variety of other materials might be used within the present context without departing from the full and fair scope of the present disclosure. For example, tip body 32, 132, 232 could be formed by casting and/or milling, and resilient appendage 40, 140, 240 could be attached upon an outer surface of the corresponding tip body 32, 132, 232 rather than integrally molded, for instance.

INDUSTRIAL APPLICABILITY

Referring to the drawings generally, as discussed herein a snagged fishing lure can be retrieved by receiving a fishing line within one of slots 48, and fishing lure retrieval apparatus 10 down the fishing line until the snagged lure is reached. At this point the user can push against the fishing lure with tip 30, for example, with end surface 60 approximately as depicted in FIG. 3, or by wiggling tip 30 around to ensnare hooks 54 in resilient appendage 40. As noted above, resilient appendage 40 is optimized in a number of ways, including turn-to-turn distance 96, spring rate or stiffness, and other characteristics. Turn-to-turn distance 96 can be close or identical to a standard distal fishing rod eyelet diameter such that virtually all commercially available fishing lures are unlikely to be pulled through a spacing formed by slots 48. It can also be appreciated that slots 48 enable fishing lure retrieval apparatus 10 to be engaged with a fishing line and lure without the necessity of actually encircling the fishing line. The multiple slots 48 enable a user to rest fishing lure retrieval apparatus 10, in particular tip 30, upon a fishing line at a range of locations without any need for opening or closing, tying, untying, clamping or otherwise manipulating a line engagement mechanism. It is expected that many times the fishing lure can be retrieved and resilient appendage 40 simply lifted off of the line and easily disengaged. Particularly in the context of tournament fishing where time is often of the essence, the present disclosure is expected to facilitate speedy and reliable retrieval of snagged fishing lures in this general manner. It will also be recalled that spring rate of resilient appendage 40 is relatively high, meaning that resilient appendage 40 is relatively stiff and difficult to deflect compared to certain other standard machine springs and the like. Among other things, this stiffness can be expected to enable resilient appendage 40 to retain connection with a fishing lure without being deflected by snagging debris or the like in a manner that would cause the fishing lure to be decoupled. Resiliency of resilient appendage 40, relative to other parts of apparatus 10 such as tip body 32, nevertheless enables tip 30 to be jammed into confined spaces without itself becoming snagged, breaking the fishing line, or causing other problems. Still other features and advantages of the present disclosure relate to the capacity for apparatus 10 to be used to lift floating debris or sunken articles, for example, by snagging such items with resilient appendage 40 itself. It can also be readily appreciated in view of the present disclosure that fishing lure retrieval apparatus 10 can be used as a pushing device for controlling the motion or position of a boat. The relatively rugged construction of tip body 32 and the placement of resilient appendage 40 axially inward and oriented to project outwardly from tip body 32 is well suited for such purposes.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Moreover, it should be appreciated that description of any embodiment, or individual feature of any embodiment, should be understood to apply without limitation to any other embodiment or individual feature thereof except where otherwise indicated. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A tip for a fishing lure retrieval apparatus comprising:
a tip body defining a longitudinal axis, and having an outer peripheral surface extending around the longitudinal axis, and longitudinally between a first tip body end and a second tip body end;
the outer peripheral surface having a substantially planar side opposite a substantially cylindrical side in a direction that crosses the longitudinal axis;
the first tip body end including an engagement element having an engagement surface structured to engage with a mating surface of a handle for the lure retrieval apparatus to couple the lure retrieval apparatus to the handle;
a resilient appendage attached to the tip body at a location that is axially between the first tip body end and the second tip body end; and
the resilient appendage projecting from the outer peripheral surface and having formed therein a plurality of slots disposed substantially parallel to the longitudinal axis and distributed successively along the resilient appendage in a radially outward direction, for receiving a fishing line at a range of locations relative to the tip body,
the resilient appendage defining a transverse axis passing through the substantially planar side and the substantially cylindrical side.

2. The tip of claim 1 wherein the substantially planar side has a display receptacle formed therein, and further comprising a transparent display cover inset within the display receptacle.

3. An apparatus for retrieving snagged fishing lures comprising:
a handle having an elongate shaft extending between a gripping end and a retrieval end;
a tip including a tip body defining a longitudinal axis and including an outer peripheral surface extending between a first tip body end coupled to the retrieval end of the handle, and a second tip body end;
the tip further including a resilient appendage attached to the tip body at a location that is axially between the first tip body end and the second tip body end, and is closer to the second tip body end than to the first tip body end; and
the resilient appendage projecting from the outer peripheral surface in a direction normal to the longitudinal axis, and having formed therein a plurality of slots disposed substantially parallel to the longitudinal axis and distributed successively along the resilient appendage in a radially outward direction from the longitudinal axis, for receiving a fishing line at a range of locations relative to the tip body;
the resilient appendage includes a coil spring, wherein an outside diameter of the coil spring is 1 inch or less, and the coil spring has a spring rate of about 30 pounds per inch or greater.

4. The apparatus of claim 3 wherein the handle includes a locking mechanism coupled between a first shaft component that includes the gripping end and a second shaft component that includes the retrieval end and is slidable relative to the first shaft element to vary a length of the handle.

5. The apparatus of claim 3 wherein the tip body is formed of a molded non-metallic material of uniform composition throughout.

6. The apparatus of claim 5 wherein the resilient appendage is formed of a metallic material molded integrally within the tip body.

7. The apparatus of claim 3 wherein a turn-to-turn distance of the coil spring is about 0.3 inches or less, and an inside diameter of the coil spring is about 0.5 inches or greater.

8. The apparatus of claim 3 wherein the outer peripheral surface includes a substantially planar side, and the outer peripheral surface further includes a substantially cylindrical side at an angular location about the longitudinal axis that is opposite an angular location of the substantially planar side.

9. A tip for a fishing lure retrieval apparatus comprising:
a tip body defining a longitudinal axis, and having an outer peripheral surface extending around the longitudinal axis, and longitudinally between a first tip body end and a second tip body end;
the first tip body end including an engagement element having an engagement surface structured to engage with a mating surface of a handle for the lure retrieval apparatus to couple the lure retrieval apparatus to the handle;
a resilient appendage attached to the tip body at a location that is axially between the first tip body end and the second tip body end;
the resilient appendage projecting from the outer peripheral surface and having formed therein a plurality of slots disposed substantially parallel to the longitudinal axis and distributed successively along the resilient appendage in a radially outward direction, for receiving a fishing line at a range of locations relative to the tip body;
the resilient appendage further defines a transverse axis, and the plurality of slots together form a helical void;
the helical void originating at the outer peripheral surface and advancing, in the radially outward direction, in a helical path that extends circumferentially around the transverse axis a plurality of times; and
the transverse axis is oriented substantially normal to the longitudinal axis and extends through the tip body
the resilient appendage includes a coil spring, wherein an outside diameter of the coil spring is 1 inch or less, and the coil spring has a spring rate of about 30 pounds per inch or greater.

10. The tip of claim 9 wherein the helical void is continuous from the outer peripheral surface to a distal tip of the resilient appendage.

11. The tip of claim 9 wherein a turn-to-turn distance of the coil spring is from about 0.1 inches to about 0.3 inches.

12. The tip of claim 11 wherein the turn-to-turn distance of the coil spring is from about 0.15 inches to about 0.20 inches.

13. The tip of claim 9 wherein an inside diameter of the coil spring is about 0.5 inches or greater.

14. The tip of claim 9 wherein the tip body is formed of a molded non-metallic material of uniform composition throughout, and the coil spring is formed of a metallic material and includes spring coils molded integrally within the tip body, and spring coils outside of the tip body.

15. The tip of claim 14 wherein the outer peripheral surface includes a substantially planar side, and a substantially cylindrical side.

16. The tip of claim 15 wherein the substantially planar side has a display receptacle formed therein, and further comprising a transparent display cover inset within the display receptacle.

17. The tip of claim 9 wherein the tip body further includes a bore formed in the first tip body end, and wherein the engagement element includes an internal thread within the bore and the engagement surface includes a surface of the internal thread.

* * * * *